US005453879A

United States Patent [19]

Ishii et al.

[11] Patent Number: 5,453,879
[45] Date of Patent: Sep. 26, 1995

[54] LENS BARREL WITH BIASING MEMBER POSITIONED BETWEEN TWO ANNULAR MEMBERS

[75] Inventors: Tadayoshi Ishii; Hiroshi Takeuchi, both of Saitama, Japan

[73] Assignee: Asahi Seimitsu Kabushiki Kaisha, Saitama, Japan

[21] Appl. No.: 143,758

[22] Filed: Nov. 1, 1993

[30] Foreign Application Priority Data

Nov. 2, 1992 [JP] Japan .................................. 4-294181

[51] Int. Cl.⁶ ............................ G02B 7/02; G02B 15/14
[52] U.S. Cl. ......................... 359/694; 359/696; 359/703; 359/704
[58] Field of Search ...................... 359/694, 696, 359/703, 704

[56] References Cited

U.S. PATENT DOCUMENTS

| | | | |
|---|---|---|---|
| 5,191,478 | 3/1993 | Horiguchi | 359/703 |
| 5,225,938 | 7/1993 | Nomura | 359/699 |
| 5,239,417 | 8/1993 | Eguchi | 359/823 |

Primary Examiner—Scott J. Sugarman
Assistant Examiner—Ray L. Mack
Attorney, Agent, or Firm—Sandler, Greenblum & Bernstein

[57] ABSTRACT

A lens barrel is provided having a lens system, and two annular members that are engaged and rotatable relative to one another, with one of the annular members being arranged inside of the other. A lens group is connected to one of the two annular members, and a biasing mechanism for forcing the two annular members into flush tangential contact is provided. A line of contact of the two annular members is substantially parallel to an optical axis of the lens system.

20 Claims, 3 Drawing Sheets

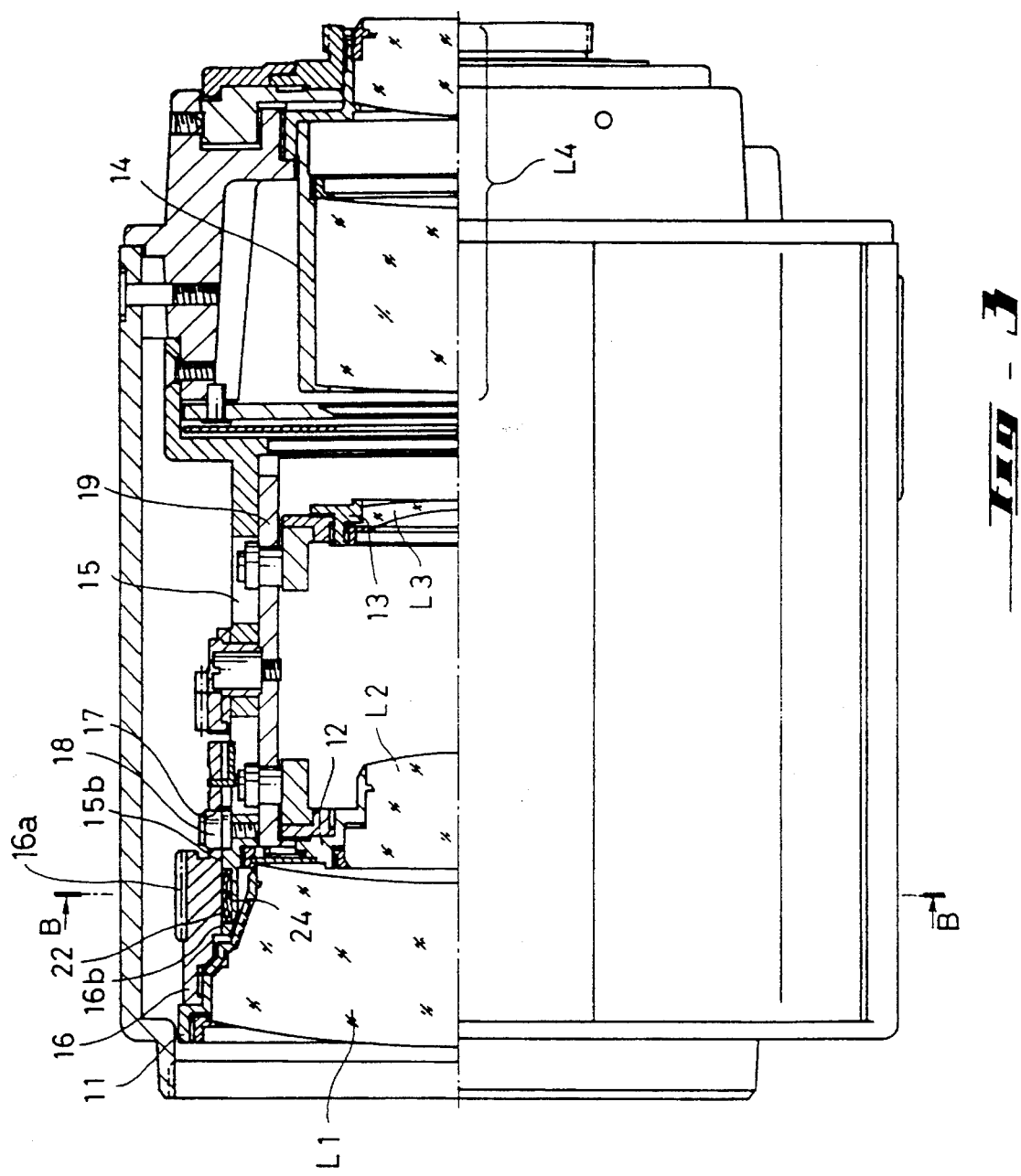

LENS BARREL WITH BIASING MEMBER POSITIONED BETWEEN TWO ANNULAR MEMBERS

BACKGROUND OF THE INVENTION

1. Field of the Invention

The present invention is directed to a lens barrel which minimizes an image shifting phenomenon caused by a shifting of the center of a focusing lens group from an optical axis of a lens system.

2. Description of Related Art

A helicoid mechanism has been widely adopted as a focusing mechanism of a lens barrel for moving a focusing lens group along an optical axis thereof. In general, one of two annular members (e.g., a stationary lens barrel) is provided with a male helicoid and the other of the two annular members (e.g., a focusing ring provided with the focusing lens group) is provided with a female helicoid. The male and female helicoids are rotatably engaged with each other. When the focusing ring is rotated with respect to the stationary lens barrel, the focusing ring (i.e., the focusing lens group) moves along the optical axis in accordance with a leading angle of the helicoid to effect a focusing operation.

Another type of focusing mechanism is known in which a helicoid mechanism is not used. In this mechanism, a focusing ring is provided with a leading groove having a predetermined leading angle with which a roller provided on the stationary barrel is engaged.

The above-mentioned focusing mechanisms are similar in that, in both cases, one of the two annular members moves relative to the other along an optical axis when a relative rotational movement occurs between the two annular members, and further in that a focusing lens group is connected to one of the two annular members.

In the focusing mechanisms, a space (clearance) always exists between the engaged annular members. As a result, there is a possibility that the focusing lens group will shift by a small amount in a direction normal to the optical axis in the existing space. There is also a possibility that the optical axis of the focusing lens group will tilt to a certain degree, depending upon the breadth of the space. In particular, in the case of a surveillance camera in which a motor is used for a focusing operation, when a rotational driving power is applied to one of the two annular members through a gear or a gear train, it is impossible to avoid tilting of the focusing lens group and occurrence of deviation of the center of the focusing lens group from an optical axis of the lens system (hereinafter the center of the focusing lens will be referred to as a "principal point", and the deviation of the focusing lens group from the optical axis of the lens system will be referred to as a "shift of principal point"). The shift of principal point tends to occur when the direction of the driving motor is reversed.

The shift of principal point can be neglected in a still camera, as long as the amount of the shift is small. However, in the case of a surveillance camera in which an image formed by a photographing optical system is focused on a solid-state image sensor such as a charge coupled image sensor, and the image is observed on a monitor, when a shift of principal point takes place while an observer is watching the monitor, he or she will notice an "an image shifting phenomenon" on the monitor. The image shifting phenomenon makes the image on the monitor difficult to observe, resulting in low reliability of the system. The image shifting phenomenon tends to occur when the direction of movement of the focusing lens group is changed, i.e., when the direction of the motor is reversed.

Recently, surveillance cameras have become smaller. Originally, the size of a surveillance camera's solid-state image sensor was 1 inch (i.e., approximately 15.9 mm of its diagonal line). Since then, the size has been reduced to ⅔ inches (i.e., approximately 11.0 mm), ½ inch (i.e., approximately 8.0 mm), and ⅓ inch (i.e., approximately 6.0 mm). Since the image formed by a small-sized solid-state image sensor is observed while being enlarged, a slight shift of the principal point results in a large shift on the monitor. For instance, a 32 μm image shift on a 1 inch solid-state image sensor results in a 1 mm image shift on a 20 inch (i.e., approximately 500 mm) monitor. An image shift of 22 μm on a ⅔ inch solid-state image sensor, 16 μm on a ½ inch solid-state image sensor, or 12 μm on a ⅓ inch solid-state image sensor will also result in a 1 mm image shift on a 20 inch monitor.

In the table below, the amount of image shift on the above-noted types of solid-state image sensors is shown in terms of the distance which the principal point of the focusing lens group shifts from the center of the lens system optical axis. In the present embodiment, a lens in which f=56.3 mm and $f_1$=41.5 mm was used for determination of the values in the table, wherein "f" is equal to a composite focal length on the long focal length side of a lens system, and "$f_1$" is equal to a focal length of the focusing lens group. An image focusing plane is moved by a ratio of $f/f_1$. In the above example, this ratio is equal to 1.3566. The shift amount of the principal point of the focusing lens group is calculated by dividing the image shift amount by the above coefficient of 1.3566.

| size of solid-state image sensor | amount of image shift on solid-state image sensor | shift of principal point of focusing lens group |
| --- | --- | --- |
| 1" | 32 μm | 24 μm |
| ⅔" | 22 μm | 16 μm |
| ½" | 16 μm | 12 μm |
| ⅓" | 12 μm | 9 μm |

The above result implies that the space between the two annular members which are engaged to each other must be made less than 9 μm in order to make the image shift on a monitor less than 1 mm, in the case that a ⅓ inch solid-state image sensor and a 20 inch-sized monitor are used. However, even with the latest manufacturing technology, it would be quite difficult to attain this result.

On the other hand, with the present manufacturing technology, it is possible to reduce the space to about 30 to 60 μm, in the case that two annular members are engaged by helicoid. When the space is reduced by this amount, if a high-viscosity lubricating oil, such as grease, is introduced into the space, the image shifting phenomenon can be substantially eliminated. However, if a high-viscosity lubricating oil is used, the temperature range within which the system can be used is narrow. Accordingly, under severe temperature conditions, a high-viscous lubricating oil cannot be used for eliminating the image shifting phenomenon.

SUMMARY OF THE INVENTION

The primary object of the present invention is to provide a lens barrel in which the image shifting phenomenon caused by the shift of principal point is reduced, or substantially eliminated. Another object of the present invention is to provide a lens barrel in which the shift of principal point does not easily occur.

It is impractical from a manufacturing technology and cost standpoint to attempt to increase the precision of engagement between the two annular members in order to eliminate the image shifting phenomenon. Accordingly, the present invention approaches the problem by minimizing the effect of the image shifting phenomenon in a lens barrel in which a space between the two annular members inevitably occurs as a result of the manufacturing process.

The present invention resulted from the determination that, even if the principal point of a focusing lens group is deviated, to some degree, from an optical axis of a lens system, the image shifting phenomenon does not occur as long as there is no relative movement between the principal point and the optical axis. Also image resolution will not deteriorate if the deviation of the principal point from a regular optical axis of the whole lens system falls within an acceptable limit.

To achieve the object mentioned above, according to the present invention, a lens barrel is provided that includes a lens system and two annular members that are engaged and rotatable relative to one another, with one of the annular members being arranged inside of the other. A lens group that is part of the lens system and that is connected to one of the two annular members, and a biasing mechanism for forcing the two annular members into flush tangential contact are also provided. The line of contact of the two annular members is substantially parallel to an optical axis of the lens group.

If the two engaged annular members are in flush tangential contact along a predetermined line, the axes of the two annular members will not be exactly coincident with each other. A change in distance between the two axes does not occur when there is a relative rotational movement between the two annular members. Since both the axes are maintained parallel to each other while maintaining the distance therebetween, the lens system optical axis will not be tilted. With this arrangement, the degree of deterioration of image resolution is neglectable and an excellent effect results in which the image shifting phenomenon is almost entirely eliminated.

The two annular members can be effectively forced into flush tangential contact by a small number of elastic members. For example, a single elastic member can be provided diametrically opposite to the flush tangential contacting portion of the annular members. Two additional elastic members can then be provided opposite each other on a diameter rotated 90 degrees from the diameter defined by the flush tangentially contacting portion and the first elastic member.

Although it varies depending upon the sensitivity of the focusing lens group, the present invention is preferably applied to a lens barrel in which the space between the two annular members is between 30 μm and 100 μm. More preferably, the space should be between 30 μm and 80 μm.

The present disclosure relates to subject matter contained in Japanese Patent Application No. HEI 4-294181 (filed on Nov. 2, 1992) which is expressly incorporated herein by reference in its entirety.

BRIEF DESCRIPTION OF THE DRAWINGS

The invention will be described below in detail with reference to the accompanying drawings, in which:

FIG. 3 is a longitudinal cut-away view of the lens barrel according to an embodiment of the present invention.

DESCRIPTION OF THE PREFERRED EMBODIMENTS

Figure 1:
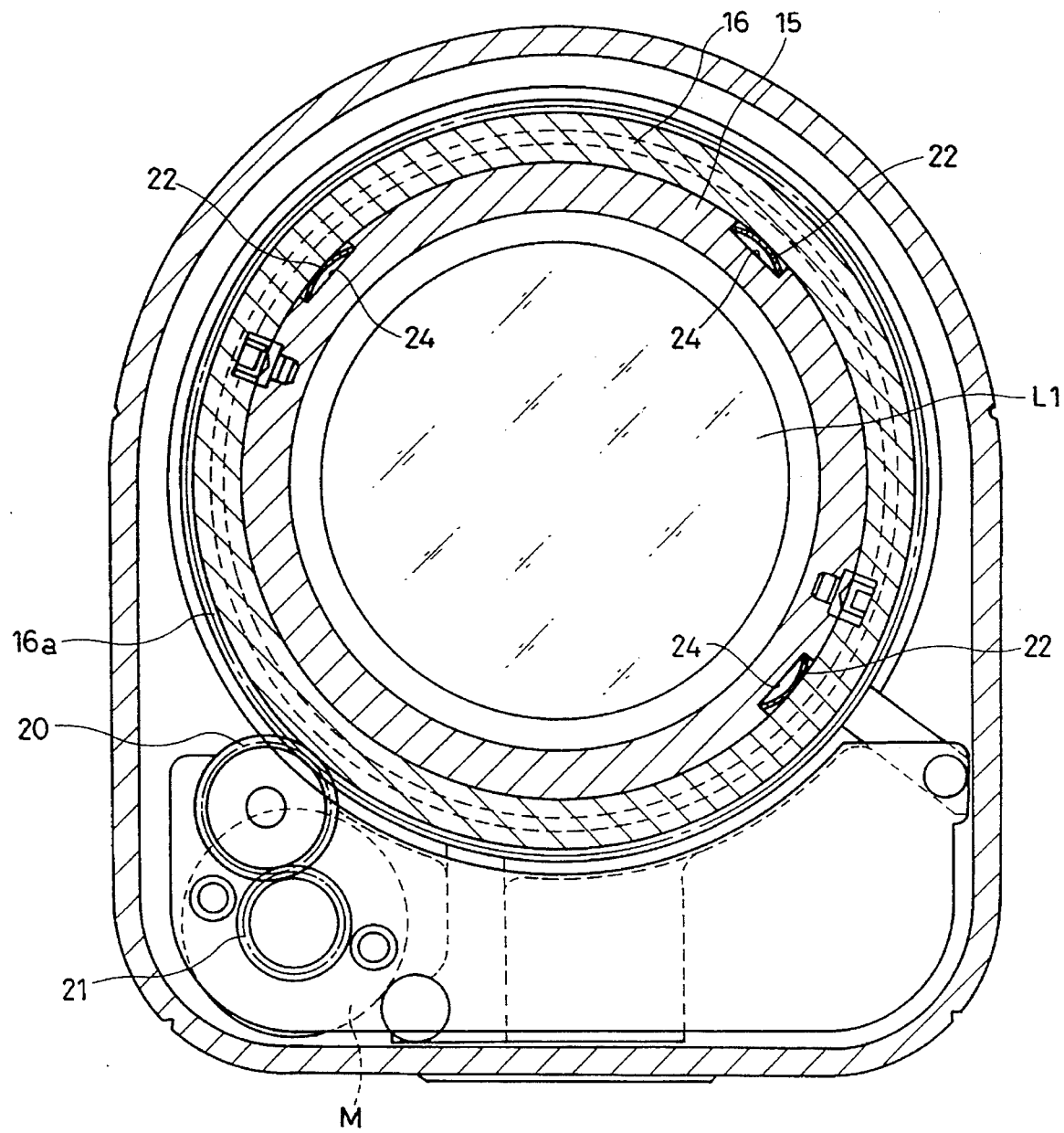
FIG. 1 is a sectional view of a lens barrel along line B—B of FIG. 3, according to an embodiment of the present invention.

FIG. 3 shows the structure of a surveillance camera to which the present invention is applied. The surveillance camera is provided with, from a photographing object side, a focusing lens group L1, a variable lens group L2, a compensator lens group L3, and a master lens group L4. These lens groups L1, L2, L3, and L4 are supported by lens supporting frames 11, 12, 13, and 14, respectively.

The lens supporting frame 11 is fixed to a focusing ring 16 which is located in the outer circumferential portion of a stationary barrel 15. The stationary barrel 15 and the focusing ring 16 are threadedly-engaged to each other, with the focusing ring 16 being on the outside. The stationary barrel 15 and the focusing ring 16 are two annular members which are the subject matter of the present invention. The focusing ring 16 is provided with a leading groove 17 which is inclined with respect to a circumferential direction of the focusing ring 16. A guide pin 18 projecting from the stationary barrel 15 is engaged with leading groove 17. Accordingly, when the focusing ring 16 rotates with respect to the stationary barrel 15, the focusing ring 16 moves forwardly and rearwardly along an optical axis of the lens system in accordance with the profile of the leading groove 17 and the guide pin 18.

Figure 2:
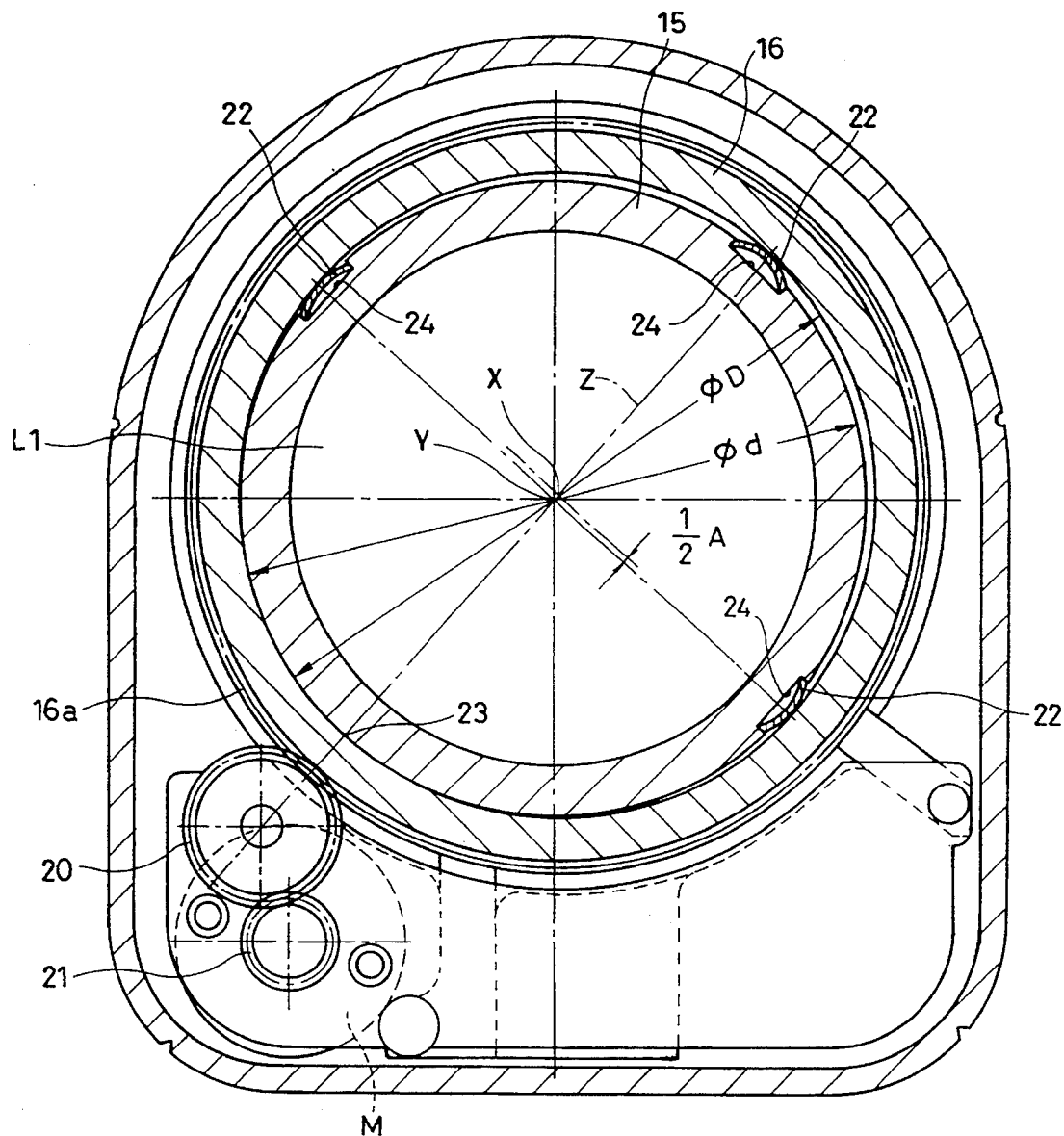
FIG. 2 is a sectional view similar to that of FIG. 1, in which the space between two annular members and eccentricity of an optical axis are exaggerated to show the main features of the present invention.

The lens supporting frames 12 and 13 are guided by the stationary barrel 15 in a manner such that the lens supporting frames 12 and 13 are linearly moved and move in the optical axis direction by rotation of a cam ring 19 which is rotatably engaged to the inner circumferential portion of the stationary barrel 15 in a predetermined manner. The master lens group L4 is fixed to the stationary lens barrel 15. A circumferential rack 16a is formed on the outer peripheral surface of the focusing ring 16. A pinion 20 is engaged with the circumferential rack 16a as shown in FIGS. 1 and 2. The pinion 20 is driven by a motor pinion 21 which is connected to a drive shaft (not shown) of a motor M.

In a lens barrel in which the present invention is applied, elastic members (i.e., arc-shaped plate springs) 22, which bias the focusing ring 16 in a predetermined direction with respect to the stationary barrel 15, are provided between the stationary barrel 15 and the focusing ring 16. The stationary barrel 15 and the focusing ring 16 are forced into flush tangential contact at a portion shown at numeral 23 in FIG. 2.

Grooves 24 are provided at three different positions of the outer peripheral surface of the stationary barrel 15. The three different positions are any three positions out of four equally spaced positions on the outer peripheral surface of the stationary barrel 15, one position of which is the point of flush tangential contact of the annular members. An elastic member 22 is provided in each of the grooves 24. The focusing ring 16 is biased by the elastic members 22. As a result, the stationary barrel 15 and the focusing ring 16 are forced into flush tangential contact at the portion 23.

Now, supposing that the inner diameter of the focusing ring 16 is φ D, the outer diameter of the stationary barrel 15 φ d, the space of engagement between the focusing ring 16 and the stationary barrel 15 is equal to φ D–φ d (A in FIG. 2). The axial center X of the focusing ring 16 will be eccentric by A/2 in the direction of the elastic member 22 which is positioned at the side opposite of the flush tangential contacting portion 23, with respect to the center (i.e., lens system optical axis) Y of the stationary barrel 15. Therefore, when the space A is 80 μm or 60 μm, A/2 is 40 μm or 30 μm, respectively. This degree of deviation of the focusing lens L1 from the lens system optical axis proves to have little influence on the resolution of the image, according to the experiment carried out in the present invention.

With this arrangement, in which the stationary barrel 15 and the focusing ring 16 are forced into flush tangential contact at the flush tangential contacting portion 23 by a resultant restoring force of the elastic members 22, the position of the flush tangential contacting portion 23 does not move when the focusing ring 16 is driven to rotate through the pinion 20 and the circumferential rack 16a. Even if the position should move, the amount of shift of the principal point of the focusing lens group L1 would be quite small, and the image shifting phenomenon would still be effectively eliminated. Moreover, according to the above embodiment, since the pinion 20 is engaged with the circumferential rack 16a at the position which is positioned radially opposite to the flush tangential contacting portion 23 on the focusing ring 16, the resultant restoring force of all of the elastic members 22, which act on the stationary barrel 15 when the focusing ring 16 rotates in one direction, is the same as that which occurs when the focusing ring 16 rotates in the opposite direction. In other words, since two of the elastic members 22 radially facing each other are symmetrically provided with respect to an imaginary line Z connecting the flush tangential contacting portion 23 and the elastic member 22 positioned radially opposite to the flush tangential contacting portion 23, the same effect for preventing the image shifting phenomenon can be expected when the pinion 20 rotates in either direction.

In the above embodiment, the stationary barrel 15 and the focusing ring 16 are engaged through the leading groove 17 and the guide pin 18. However, the present invention could also be adopted to a focusing mechanism in which the stationary barrel 15 and the focusing ring 16 are engaged by helicoid gears, without the use of the leading groove 17 or the guide pin 18.

In the present embodiment, the invention is applied to a focusing lens group. However, the present invention could also be applied to other lens groups such as a variable power lens group of a zoom lens.

As can be seen from the foregoing, according to the present invention, the movement of the principal point of a lens group can be reduced in a lens barrel in which two engaged annular members are provided where there is a relative rotational movement therebetween, wherein the lens group is connected to one of the two annular members which are engaged with each other, and wherein one of the two annular members are movable with respect to the other along an optical axis of the lens group in accordance with the relative rotational movement. Accordingly, in the case that the lens group is a focusing lens group, the image shift phenomenon caused by movement of principal point can be effectively reduced or substantially eliminated. The present invention is effective, in particular, for a surveillance camera that produces an image on a monitor that is to be continuously and carefully observed.

Although the invention has been described with reference to particular means, materials and embodiments, it is to be understood that the invention is not limited to the particulars disclosed and extends to all equivalents within the scope of the claims.

We claim:

1. A lens barrel, comprising:

a lens system;

two annular members that are engaged with and rotatable relative to one another, one of said two annular members being arranged inside of the other of said two annular members;

a lens group that is part of said lens system and that is connected to said one of said two annular members; and, biasing means, positioned in a space between said two annular members, for forcing said two annular members into flush tangential contact, wherein a line of contact of said two annular members is substantially parallel to an optical axis of said lens system, said line of contact being at a circumferential position spaced from a circumferential position of said biasing means.

2. The lens barrel of claim 1, wherein said biasing means comprises at least two biasing members which are spaced in a circumferential direction of said annular members.

3. The lens barrel of claim 1, wherein said biasing means comprises a first elastic member provided diametrically opposite to a flush tangential contacting portion of said two annular members, and two additional elastic members provided diametrically opposite each other and spaced 90 degrees from a diameter defined by said flush tangential contacting portion and said first elastic member.

4. The lens barrel of claim 1, wherein said lens group is a focusing lens group.

5. The lens barrel of claim 1, wherein a two annular members are engaged in a manner such that one of said two annular members moves relative to the other in an optical axis direction of said lens system in accordance with said relative rotational movement.

6. The lens barrel of claim 5, wherein one of said two annular members is driven to rotate in forward and reverse directions by a motor.

7. The lens barrel of claim 5, wherein said two annular members are engaged to each other by helicoid gears.

8. The lens barrel of claim 5, wherein one of said two annular members is provided with a leading groove which is inclined with respect to a circumferential direction of said annular member, and wherein the other of said two annular members is provided with a pin which constantly engages with said leading groove.

9. The lens barrel of claim 1, said biasing means comprising an elastic member positioned between said two annular members.

10. A lens barrel, comprising:

a lens system;

a stationary lens barrel;

a focusing ring which is engaged with said stationary lens barrel such that said focusing ring can rotate relative to said stationary barrel and move along an axis of said lens barrel;

a focusing lens group which is part of said lens system, and which is supported by said focusing ring;

a circumferential rack which is provided on an outer peripheral surface of said focusing ring;

a pinion which is engaged with said circumferential rack;

a motor which drives said pinion in forward and reverse directions; and, biasing means, positioned in a space formed between said focusing ring and said stationary barrel, for forcing said focusing ring into flush tangential contact with said stationary barrel along a predetermined line, said predetermined line being at a circumferential position spaced from said biasing means and parallel to an optical axis of said lens system.

11. The lens barrel of claim 10, wherein said biasing means is at least one elastic member which is provided in an insertion groove formed on an outer peripheral surface of said stationary barrel, and comes into contact with an inner peripheral surface of said focusing ring.

12. The lens barrel of claim 11, wherein said at least one elastic member is provided diametrically opposite to a flush tangential contacting portion of two annular members, and at portions diametrically opposite each other and spaced 90 degrees from a diameter defined by said flush tangential contacting portion and said at least one elastic member.

13. The lens barrel of claim 12, wherein said pinion is engaged with said circumferential rack at a position which is positioned radially opposite to said flush tangential contacting portion on said focusing ring.

14. The lens barrel of claim 10 wherein said lens barrel is a surveillance camera.

15. The lens barrel of claim 11 wherein an image formed by said lens barrel is focused on a solid-state image sensor and is observed on a monitor.

16. The lens barrel of claim 10 said biasing means comprising at least two biasing members spaced from each other along a circumferential direction of said focusing ring and said stationary barrel.

17. The lens barrel of claim 10, said biasing means comprising an elastic member positioned between said focusing ring and said stationary barrel.

18. A lens barrel, comprising:

a lens system;

a stationary annular member;

a rotatably annular members that is rotatably engaged with said stationary annular member at an outer circumferential portion of said stationary annular member;

a lens group that is connected to said rotatably annular member; and, biasing means, positioned in a space formed between said stationary and rotatably annular members, for forcing said rotatable annular member into flush tangential contact with said stationary annular member, wherein a line of contact of said rotatable and stationary annular members is substantially parrallel to an optical axis of said lens system and located at a circumferential position spaced from said biasing means, wherein a distance between a center axis of said rotatable annular member and an optical axis of said lens system is maintained constant during rotation and during a change in direction of rotation of said rotatable annular member.

19. The lens barrel of claim 18, said biasing means comprising at least two biasing members spaced from each other along a circumferential direction of said rotating annular member and said stationary annular member.

20. The lens barrel of claim 18, said biasing means comprising an elastic member positioned between said rotating annular member and said stationary annular member.

* * * * *

UNITED STATES PATENT AND TRADEMARK OFFICE
CERTIFICATE OF CORRECTION

PATENT NO. : 5,453,879
DATED : September 26, 1995
INVENTOR(S) : T. ISHII et al.

It is certified that error appears in the above-indentified patent and that said Letters Patent is hereby corrected as shown below:

At column 6, line 42 (claim 5, line 1), change "a" to ---said---.

At column 6, line 45 (claim 5, line 4), change "said" (second occurrence) to ---a---.

At column 8, line 7 (claim 18, line 4), change "members" to ---member---.

Signed and Sealed this

Nineteenth Day of November, 1996

Attest:

BRUCE LEHMAN

*Attesting Officer*     *Commissioner of Patents and Trademarks*